United States Patent
Rai

(10) Patent No.: US 7,324,808 B2
(45) Date of Patent: Jan. 29, 2008

(54) INFORMATION DELIVERY METHOD FOR COMMUNICATION SYSTEMS

(75) Inventor: Vikram Rai, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1158 days.

(21) Appl. No.: 09/849,088

(22) Filed: May 4, 2001

(65) Prior Publication Data

US 2002/0165014 A1 Nov. 7, 2002

(51) Int. Cl.
*H04Q 7/22* (2006.01)
(52) U.S. Cl. .................. 455/412.1; 455/413; 455/422.1
(58) Field of Classification Search ................ 455/517, 455/412.1, 514, 450, 466
See application file for complete search history.

(56) References Cited

U.S. PATENT DOCUMENTS

| | | | |
|---|---|---|---|
| 5,467,341 A * | 11/1995 | Matsukane et al. ......... 370/253 |
| 5,487,071 A * | 1/1996 | Nordstrand et al. ........ 370/236 |
| 6,023,620 A * | 2/2000 | Hansson ..................... 455/419 |
| 6,044,275 A * | 3/2000 | Boltz et al. ................. 455/466 |
| 6,091,947 A * | 7/2000 | Sumner ...................... 455/413 |
| 6,119,014 A * | 9/2000 | Alperovich et al. ........ 455/466 |
| 6,223,045 B1 * | 4/2001 | Valentine et al. ........... 455/466 |
| 6,597,917 B1 * | 7/2003 | Meuronen ................... 455/466 |
| 2001/0001089 A1 * | 5/2001 | Krishnamurthi et al. .... 455/414 |
| 2002/0110116 A1 * | 8/2002 | Aaltonen ..................... 370/352 |

* cited by examiner

*Primary Examiner*—Temica Beamer

(57) ABSTRACT

A method for delivering certain types of user information over a communication system is provided. Users identify certain user signals that can be transmitted in non-real time, and transmit such signals over signaling channels of the communication system. The system receives and stores these non-real time signals and transmits them over available traffic channels to their destinations at some later time. The user or the communication system defines when such non real time signals are to be transmitted over the traffic channels to their destinations. In this manner, the probability of real time signals and user identified non real time signals competing for traffic channels or other resources of the system is greatly reduced thus allowing the communication system to maintain or even increase its capacity.

14 Claims, 2 Drawing Sheets

INFORMATION DELIVERY METHOD FOR COMMUNICATION SYSTEMS

BACKGROUND OF THE INVENTION

1. Field of the Invention

The present invention is generally related to communication systems and more particularly to a method of delivering information in a communication system.

2. Description of the Related Art

Service providers, which are entities that own, operate and control equipment constituting a communication system, are constantly searching for ways to improve the capacity of their systems. The capacity of a communication system relates to the number users that is served by a system at a particular time and/or the amount of information that can be conveyed (i.e., transmitted and/or received) over the communication system. System providers have a limited amount of available resources and therefore have to develop new techniques of using their resources in an efficient manner in order to maintain or increase their system's capacity. The resources of a communication system are the various equipment, various techniques used to operate such equipment and the different processing algorithms used in the communication system. Examples of system resources are radio transmission and reception equipment of the system, the amount of bandwidth allocated to the system and the amount of power allocated to transmitted signals. Resources such as system bandwidth and amount of power used in transmitting signals are regulated by governmental and standards organizations. Other resources such as radio equipment are relatively costly. Therefore, in many circumstances a service provider does not have the luxury of simply increasing its resources in order to increase capacity. Service providers therefore resort to searching for techniques that can be used to efficiently process certain communication signals in order to maintain or increase system capacity. In many communication systems, different types of user signals are conveyed. User signals carry user information which are distinguished from signals generated by system equipment which carry system information. User information is any type of information typically conveyed between users of a communication system. Signals that carry system information are generated by system and user equipment and are used by the system to operate and otherwise manage the communication system. User signals are generated by user equipment. An important type of user signal are voice signals which are real time signals that are sensitive to time delays or gaps that occur during their transmission. Real time signals are transmitted upon their creation; that is, as soon as the signal is created, it is transmitted. Once transmission of a real time signal has begun, the signal cannot tolerate any significant time delay in its processing other than front end delay. For example, a voice signal can be delayed prior to start of transmission (i.e., front end delay), but once transmission of such a signal has started any gap in transmission will cause the signal to become at least momentarily unintelligible. Another example of a real time signal is a live video signal, which also cannot tolerate any gap in transmission. Typically, a real time signal is formatted as a block of consecutive packets in which the packets are transmitted without any significant time gaps between them. Communication systems give real time signals priority over non-real time signals. A real time signal that has been received by system equipment has to be transmitted by such equipment within a certain time period to avoid the signal becoming unintelligible. The communication system has to have resources available to handle real time signals otherwise the received real time signals will be distorted.

When a user signal is received by system equipment, communication channels are made available for the signal to allow it to reach its destination. The system applies the rules of the protocol with which it is complying in order to allocate various resources to the arriving signal for establishing communications for that signal. A protocol is typically a set of rules defined by a standard that is applied by a communication system to operate, control or otherwise manage its equipment. Established communications refers to the system providing communication channels to allow the signal to travel from its origin to its destination. The system equipment allocate various resources (e.g., algorithms, radio equipment, portion of bandwidth, amount of transmission power) to establish the communication channels. The communication channels used to convey user signals are commonly referred to as traffic channels. Thus, traffic channels are a combination of various resources of the communication system. Signals that carry system information are transmitted (and received) over signaling channels. The signaling channels are available to a user once the user is authorized to use the system. Certain system information conveyed over the signaling channel are used by the system to establish communications (i.e., allocate resources) between users of the system. If a received user signal is a real time signal, the system has to allocate the resources (i.e., traffic channels) within a certain time period for the reasons discussed above. If the received signal is a non-real time signal, the system need not allocate resources for such a signal within any defined period of time. Due to the resource obligations of real time signals, the system's capacity is significantly dependent on its ability to properly process such signals.

As the amount of real time signals being conveyed over the system increases, the system has to be able to provide the resources to these signals without jeopardizing the processing of the non-real time signals. There will be circumstances where real time signals and non-real time signals compete for the same traffic channels. In such circumstances, the system can first allocate the traffic channels to the arriving real time signals and then allocate any remaining channels to the non-real time signals. If there are no remaining traffic channels, the non-real time signals will have to wait until such channels become available. The next available channel may still not be allocated to waiting non-real time signals because other more recent arrivals of real time signals will again be given priority. As a result, non-real time signals may incur significant delays prior to being served by the communication system and many times these non-real time signals are eventually dropped from the system. Consequently, the system capacity decreases. Alternatively, the system can simply give priority to non-real time signals over real time signals when the non-real time signals have been delayed, but it does so at the risk of losing real time signals, which would also result in a decrease of the system's capacity. Regardless of whether a system gives priority to real time signals or non-real time signals, there will be circumstances where the system's capacity will be adversely affected due to the two types of signals competing for the same resources.

What is therefore needed is a method that reduces the probability of real time signals and non-real time signals competing for the same resources in a communication system thereby allowing the system to maintain or even increase its capacity.

SUMMARY OF THE INVENTION

The present invention provides a method that allows a communication system to maintain or even increase its capacity through efficient use of its resources. The method of the present invention takes advantage of the fact that not all user information need to be transmitted in real time. Certain user information, defined as user identified storable information, can be transmitted to the system and then the system ultimately delivers the information to its destination at some later time defined by the user and/or traffic channel availability. User identified storable information is any information carried by a user signal which has been identified by the user as information that, once received by the system, is to be transmitted (not in real time) by the system over an available traffic channel to its destination at a user or system specified time.

The user identified storable information is formatted, labeled and is then received over a signaling channel of the system in accordance with whatever protocol is being followed by the system. The system receives the user identified storable information over a signaling channel and stores such information. The system then determines from the contents of the user identified storable information, the destination of such information and the time at which such information is to be transmitted. Immediately prior to the transmission time, the system alerts the destination by transmitting an alert signal to the destination over a signaling channel. Upon receiving a response (over the signaling channel) to the alert signal from the destination, the system transmits the stored information to its destination over an available traffic channel. The available traffic channel is any traffic channel over which the user identified storable information can be transmitted without depriving any arriving or waiting real time signals from using such channel. Therefore, the method of the present invention allows the system to receive user identified storable information over signaling channels and transmit such information at certain times over available traffic channels to their destination. Because user signals carrying user identified storable information are received over signaling channels by the system and are transmitted at appropriate times when traffic channels are available, the likelihood of such signals competing with real time signals for resources (e.g., traffic channels) is decreased thereby allowing the system to maintain or even increase its capacity.

DETAILED DESCRIPTION

The present invention provides a method that allows a communication system to maintain or even increase its capacity through efficient use of its resources. The method of the present invention takes advantage of the fact that not all user information need to be transmitted in real time. Certain user information, defined as user identified storable information, can be transmitted to the system over a signaling channel and then the system ultimately delivers the information to its destination at some later time defined by the user and/or traffic channel availability. User identified storable information is any information carried by a user signal which has been identified by the user as information that— once received by the system over a signaling channel—is to be transmitted (not in real time) by the system over an available traffic channel to its destination at a user or system specified time. After having been labeled and formatted in accordance with the protocol being followed by the communication system and transmitted by a communication device over a signaling channel, the user identified storable information is received by the system over the signaling channel. The system stores the received user identified storable information. The system then determines from the contents of the user identified storable information, the destination of such information and the time at which such information is to be transmitted. Immediately prior to the transmission time, the system alerts the destination by transmitting an alert signal to the destination over a signaling channel. Upon receiving a response (over a signaling channel) to the alert signal from the destination, the system transmits the stored information to its destination over an available traffic channel. The available traffic channel is any traffic channel over which the user identified storable information can be transmitted without depriving any arriving or waiting real time signals from using such channel. Therefore, the method of the present invention allows the system to receive user identified storable information over signaling channels and transmit such information at certain times over available traffic channels to their destination, i.e., deliver such information. Because user signals carrying user identified storable information are received over signaling channels by the system and are transmitted at appropriate times when traffic channels are available, the likelihood of such signals competing with real time signals for resources is decreased thereby allowing the system to maintain or even increase its capacity.

Figure 1:
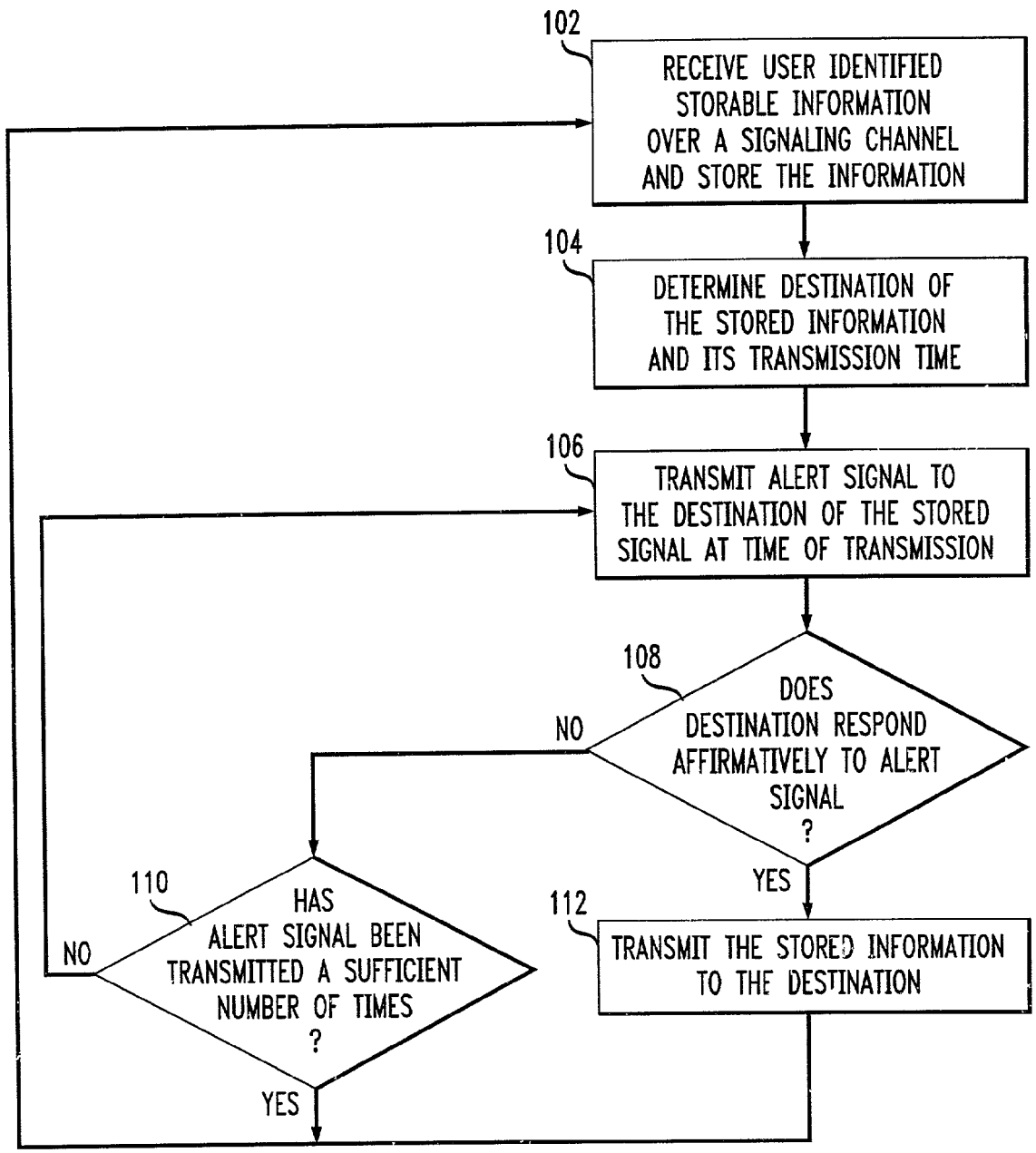
FIG. 1 is a flowchart of the method of the present invention.
Figure 2:
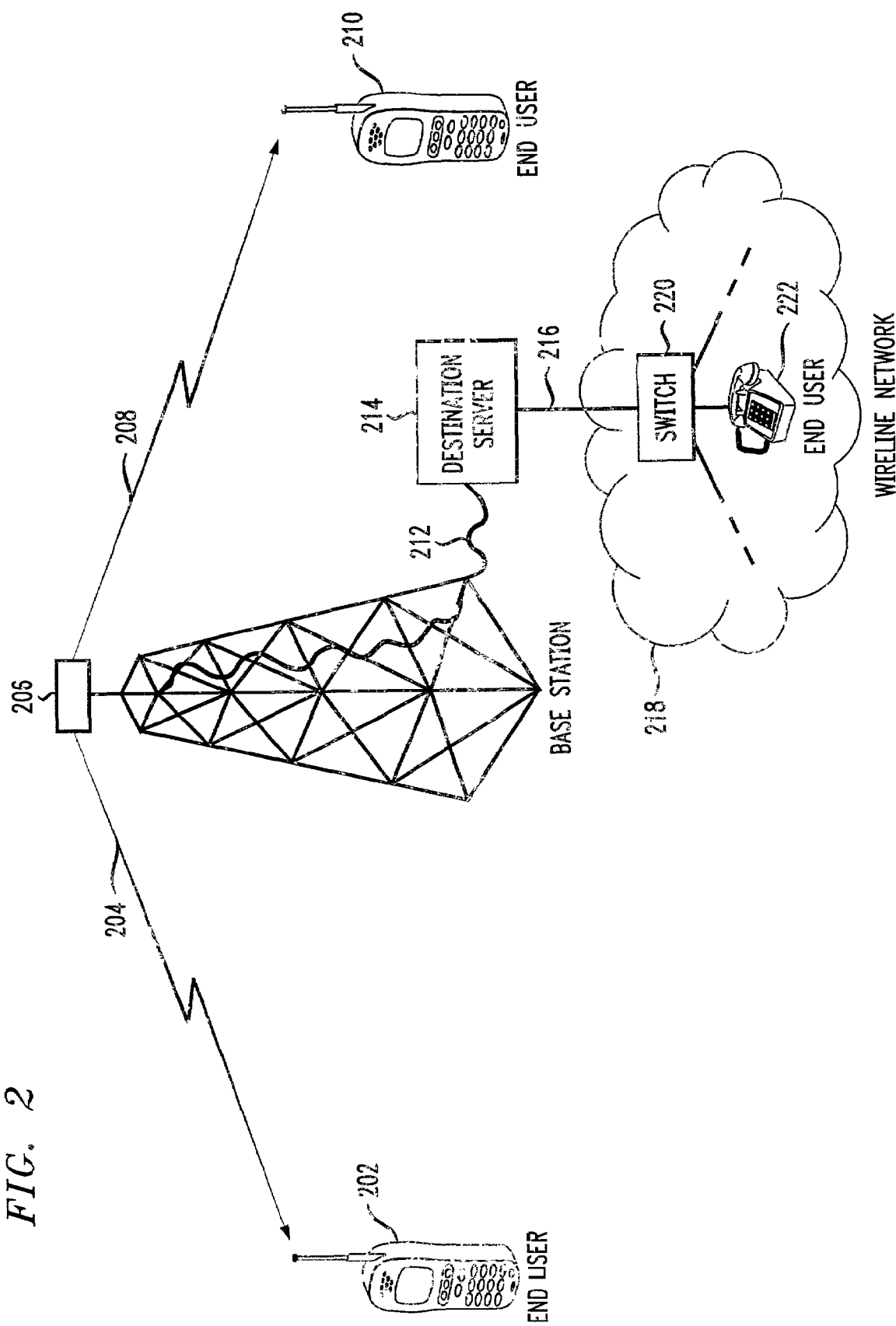
FIG. 2 depicts portions of a wireless communication system and wireline communication system to which the method of the present invention is applied.

Referring to FIG. 1, there is shown the method of the present invention. The method of the present invention will, however, be discussed in the context of the communication system shown in FIG. 2. FIG. 2 depicts a portion of a wireless communication system coupled to wireline communication system 208. The portion of the wireless communication system shown comprises end user communication device 202, air interface 204, base station 206, air interface 208 and end user communication device 210. Base station 206 is coupled to destination server 214 via communication link 212. Destination server 214 can be considered part of the wireless communication system, part of wireline communication system 218 or part of neither system. Wireline communication system 218 comprises various switches (e.g., switch 220) interconnected with other system equipment to deliver and receive information to and from end users such as end user 3 having communication device 222. Note that for illustrative purposes only communication devices 202 being used by end user 1 and communication device 210 being used by end user 2 are shown as cellular phones. Also for illustration purposes only, communication device 222 being used by end user 3 is a wireline telephone handset. It will be readily understood that the method of the present invention is not limited to any particular communication device. For example, Personal Digital Assistant (PDA) devices, wireline or wireless personal computers can also be applied to the method of the present invention.

Suppose end user 1 wishes to communicate (e.g., send a voice message or other type of information) with user 210, but not in real time. Instead of making a telephone call to end user 2, end user 1 operates cell phone 202 such that the information that is to be transmitted is labeled as a user identified storable information. Any formatting scheme consistent with the protocol being followed by the system can be used. Cellular phone 202 is configured such that it formats and labels user identified storable information in accordance with whatever signaling protocol is being used by the communication system. Many signaling protocols have formats that allow data to be conveyed between an end user and system equipment over a signaling channel; the method of the present invention can be applied to such formats. Upon completion of the voice message, the user includes the destination or destination data (e.g., phone number) of the user identified storable information and certain constraints on when the information is to be transmitted to its destination, i.e., transmission time data. The labeling and formatting of the information is done upon a storage command executed by user 1. Thus, user 1, by executing a storage command, identifies the information as information that is to be transmitted over a signaling channel to system equipment. After having received the information, the system equipment transmit such information to its destination over a traffic channel at an appropriate time.

Still referring to FIG. 2, end user 1 operates (activates a particular sequence of keys) cell phone 202 to send a voice message to end user 2. End user 1 also inputs the destination of the message, e.g., the phone number of cellular phone 210, and an approximate time as to when the message is to be transmitted to cellular phone 210. Cellular phone 202 is configured such that it recognizes the sequence keys as a command to obtain a user message, the message's destination and transmission time of the message. Cellular phone 202 labels the obtained information as user identified storable information. Cellular phone 202 then transmits the user identified storable information over a signaling channel of air interface 204 to base station 206. Air interface 204 as well as air interface 208 comprise both signaling channels and traffic channels.

Referring now to FIG. 1, in step 102 the transmitted voice message is received by base station 206. Base station 206 stores the received information. Prior to storing the received information, base station 206 recognizes the received information as user identified storable information through some type of information formatting devised by the service provider of the wireless communication system. For example, base station processing equipment is configured to search for certain flags and search certain data fields within the information format scheme of the protocol being followed by the wireless communication system. The flags indicate whether the received information is user identified storable information and the data fields contain all or part of the user identified storable information that is being transmitted over a signaling channel of air interface 204 (see FIG. 2).

In step 104 base station equipment determines the destination and the transmission time of the received and stored user identified storable information. The base station equipment determines the destination (and transmission time, if one is designated) by retrieving information from specific fields of the received information. The destination, which can also be placed in a data field, can be the telephone number of cellular phone 210. Other techniques for designating the destination of the received information can be used. End user 1 can also place instructions regarding the transmission time for the received user identified storable information in a data field. However, in some cases, the received user identified storable information may not have a transmission time. When no transmission time is specified by the user, the method of the present invention will transmit the received information based on the availability of traffic channels. The availability of traffic channels deals with whether a traffic channel can be allocated to receive user identified storable information without adversely affecting the ability of real time signals to use such channels.

In step 106, prior to the transmission of the received user identified storable information, the system sends an alert signal to the destination to (1) confirm the presence of a communication device having a matching destination address and (2) confirm that the communication device is prepared and able to receive user identified storable information. The alert signal is transmitted over a signaling channel of the system. Continuing with our example of FIG. 2, base station 206 transmits an alert signal over a signaling channel of air interface 208 to cellular phone 210.

In step 108, the method of the present invention determines whether a response to the alert signal was received indicating that the destination is prepared to and is able to receive the user identified storable information. Again, the format of the response signal complies with whatever protocol that is being followed by the system. Continuing with our example depicted by FIG. 2, cellular phone 210 sends a response signal over a signaling channel of air interface 208 to base station 206. Again, the response signal is formatted as per the protocol of the system. If the response is affirmative, then the method of the present invention moves to step 112 in which the stored information is transmitted to the destination over an available traffic channel. If there are no available traffic channels, the method of the present invention will postpone the transmission of the information until a traffic channel becomes available. After the transmission is completed the method of the present invention moves to step 102 to wait for new information. If the response is negative or if there is no response, the method of the present invention moves to step 110.

In step 110, the method of the present invention can retransmit the alert signal a certain number of times; the number of times can be designated by the system provider or by the user. For example, as part of the user identified storable information, the user can specify the number of times the system should transmit the alert signal before receiving a response signal. Alternatively, the system can wait for a specified period of time before retransmitting the alert signal. The waiting period can be specified by the user (by including it in the user identified storable information) or by the system. After a predefined time period has elapsed or after a certain number of retransmissions of the alert signal has occurred and no response signal has been received, the system will no longer attempt to transmit the stored information and the method of the present invention moves to step 102 to receive new information. In such a circumstance, the system would transmit a message to the user (over a signaling channel) informing the user that the information cannot be delivered to its destination. At that point the user can either send a message to the system (also over a signaling channel) to discontinue any more attempts at delivering the information or advise the system to try again at a later specified time (i.e., a new transmission time). If the user wishes to discontinue any more attempts at delivering the information, the method of the present invention moves to step 102 to wait for new information. Otherwise, the method of the present invention moves to step 106 and once again attempts to deliver the stored user identified storable information.

It will be readily understood that although the method of the present invention as discussed above describes an end user of a wireless communication system attempting to send a voice message to another end user of the same wireless system, the method of the present invention is certainly not limited to such a scenario. As such, the method of the present invention applies to all types of communication systems and all types of user information. For example, referring to FIG. 2, end user 1 can apply the method of the present invention to send a voice message to end user 3 of wireline communication system 218. It will be further understood that the communication devices with which a user implements the method of the present invention are configured such they format a user signal in accordance with a protocol being followed by a user and then transmit the signal over a signaling channel. Such devices are further configured to receive alert signals from system equipment (e.g., base station, destination server, switch), recognize the alert signals and respond to the alert signals (over a signaling channel) advising the system equipment whether to transmit the user identified storable information. Also, the method of the present invention is implemented with software, hardware or firmware all or some of which are resident at a base station, a destination server, a switch or other system equipment. Alternatively, the method of the present invention can reside at any combination of various system equipment.

In addition to a method for delivering user information, the method of the present invention comprises a method for transmitting user identified storable information with a communication device such as a cellular phone, PDA or personal computer. The user identified storable information is obtained, labeled and formatted. The destination and the transmission time are inserted or are included in the user identified storable information through well known operation of the communication device. Further the method of the present invention comprises a method for receiving user identified storable information over a traffic channel with a communication device such as a PDA, cellular phone or personal computer. The communication device first monitors a signaling channel for an alert signal. Upon reception of an alert signal the communication device transmit a response signal over a signaling channel to the system (e.g., base station or other system equipment). The response signal is formatted in accordance with the protocol being followed by the communication system. The communication device then receives the user identified storable information over a traffic channel of the communication system.

I claim:

1. A method for delivering user information over a communication system, the communication system including a base station that supports signaling channels for carrying system information and traffic channels for carrying the user information, the method comprising the steps of:

receiving, at the base station, user identified storable information comprising voice signals over a signaling channel between the base station and a first end user device, the user identified storable information having been identified by the first end user as information that is to be stored by the base station for a selected period of time, said identification occurring prior to initiation of a communication session between the base station and the first end-user device; and transmitting the received information from the base station to a second end-user device over an available traffic channel after the selected period of time.

2. The method of claim 1 where the step of receiving user identified storable information further comprises the steps of:

storing the received information for at least the selected period of time;

determining a transmission time and a destination from the received information;

transmitting an alert signal over a signaling channel to the destination; and receiving a response signal over the signaling channel from the destination.

3. The method of claim 2 where the step of transmitting an alert signal comprises:

formatting the alert signal in accordance with a protocol being followed by the communication system; and transmitting the alert signal over a signaling communication channel prior to the transmission time where the transmission time is specified by the user or by the system.

4. The method of claim 2 where the alert signal is transmitted a certain number of times designated by the user.

5. The method of claim 2 where the step of transmitting an alert signal further comprises the steps of:

waiting for a user specified time period for a signal responding to the transmitted alert signal;

retransmitting the alert signal a certain number of times specified by the user; and transmitting a message to the user over a signaling channel informing the user that the information cannot be delivered to its destination when no response signal is received after a certain number of retransmission has occurred.

6. The method of claim 2 where the step of determining a transmission and a destination address comprises the step of retrieving transmission time data and the destination data from the received information.

7. The method of claim 1 where the received information is transmitted over an available traffic channel at a time determined by the communication system when the user has not specified a transmission time.

8. The method of claim 1 further comprising the step of postponing the transmission of the received information until at least one traffic channel becomes available.

9. A method for transmitting user information over a communication system, the communication system including a base station that supports signaling channels for carrying system information and traffic channels for carrying the user information, the method comprises the steps of:

identifying, at a first end-user device, information comprising voice signals as information that is to be stored by the base station for a selected period of time, said identification occurring prior to initiation of a communication session between the base station and the first end-user device formatting said user identified storable information in accordance with a protocol being followed by the communication system for transmission of signals over signaling channels; and transmitting the user identified storable information over at least one signaling channel between the first end-user device and the base station.

10. The method of claim 9 where the step of formatting user identified storable information comprises the steps of:

obtaining the user identified storable information with a communication device; and inserting transmission time data and the destination data in the user identified storable information.

11. The method of claim 9 where the communication device is either a cellular phone, a PDA or a personal computer.

12. A method for receiving user information over a communication system, the communication system including a base station that supports signaling channels for carrying system information and traffic channels for carrying the user information, the method comprising the steps of:

receiving, from the base station and at a first end-user device, an alert signal over a signaling channel of the communication system;

transmitting, from the first end-user device, a response signal over a signaling channel of the communication system; and receiving, at the first end-user device, user identified storable information comprising voice signals over a traffic channel of the communication system, the user identified storable information having been identified by a second end user as information that is to be stored by the base station for a selected period of time, said identification occurring prior to initiation of a communication session between the base station and the second end-user device.

13. The method of claim 12 where the step of transmitting a response signal over a signaling channel comprises formatting the response signal in accordance with a protocol being followed by the communication system.

14. The method of claim 9 where the communication device is either a cellular phone, a PDA or a personal computer.

* * * * *